(12) United States Patent
Weingaertner et al.

(10) Patent No.: US 11,658,320 B2
(45) Date of Patent: May 23, 2023

(54) FUEL CELL SYSTEM CONTAINING WATER INJECTOR AND METHOD OF OPERATING THE SAME

(71) Applicant: BLOOM ENERGY CORPORATION, San Jose, CA (US)

(72) Inventors: David Weingaertner, Sunnyvale, CA (US); Ivan Hartana, Sunnyvale, CA (US); David Edmonston, Soquel, CA (US); Michael Petrucha, Santa Clara, CA (US); Martin Perry, Mountain View, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 17/520,302

(22) Filed: Nov. 5, 2021

(65) Prior Publication Data

US 2022/0059856 A1 Feb. 24, 2022

Related U.S. Application Data

(63) Continuation of application No. 16/741,833, filed on Jan. 14, 2020, now Pat. No. 11,196,068.

(60) Provisional application No. 62/797,986, filed on Jan. 29, 2019.

(51) Int. Cl.
*H01M 8/04* (2016.01)
*H01M 8/04828* (2016.01)
*H01M 8/04014* (2016.01)
*H01M 8/0662* (2016.01)
(Continued)

(52) U.S. Cl.
CPC .......... *H01M 8/04843* (2013.01); *H01M 8/04014* (2013.01); *H01M 8/04097* (2013.01); *H01M 8/04708* (2013.01); *H01M 8/0662* (2013.01)

(58) Field of Classification Search
CPC ........ H01M 8/04843; H01M 8/04014; H01M 8/04097
See application file for complete search history.

(56) References Cited

U.S. PATENT DOCUMENTS

| 6,653,004 B1 | 11/2003 | Barber |
| 9,287,572 B2 | 3/2016 | Weingaertner et al. |
| 9,520,602 B2 | 12/2016 | Venkataraman et al. |
| 9,941,525 B2 | 4/2018 | Perry et al. |
| 2001/0021468 A1* | 9/2001 | Kanai ............... H01M 8/04156 429/414 |

(Continued)

FOREIGN PATENT DOCUMENTS

| EP | 1235291 A2 | 8/2002 |
| JP | 2002046047 A | 2/2002 |

(Continued)

OTHER PUBLICATIONS

Notification Concerning Transmittal of International Preliminary Report on Patentability and Search Report and Written Opinion of the International Search Authority for International Patent Application No. PCT/US2020/013458, dated Aug. 12, 2021, 7 pages.

(Continued)

*Primary Examiner* — Olatunji A Godo
(74) *Attorney, Agent, or Firm* — The Marbury Law Group PLLC

(57) ABSTRACT

A method of operating a fuel cell system includes providing an anode exhaust from a fuel cell stack to a water injector, supplying water to the water injector, and injecting the water (Continued)

from the water injector into the anode exhaust to vaporize the water and generate a humidified anode exhaust.

14 Claims, 7 Drawing Sheets

(51) Int. Cl.
*H01M 8/04089* (2016.01)
*H01M 8/04701* (2016.01)

(56) References Cited

U.S. PATENT DOCUMENTS

| | | |
|---|---|---|
| 2002/0114988 A1 | 8/2002 | Iwasaki et al. |
| 2012/0196195 A1 | 8/2012 | Perry et al. |
| 2012/0321972 A1 | 12/2012 | Matcham et al. |
| 2015/0111121 A1 | 4/2015 | Weingaertner et al. |
| 2015/0244011 A1 | 8/2015 | Sudhan S. et al. |
| 2016/0126570 A1 | 5/2016 | Nagai et al. |
| 2017/0012309 A1* | 1/2017 | Venkat .............. H01M 8/04626 |
| 2020/0243885 A1 | 7/2020 | Weingaertner et al. |

FOREIGN PATENT DOCUMENTS

| | | |
|---|---|---|
| JP | 2003077517 A | 3/2003 |
| JP | 2016091644 A | 5/2016 |
| JP | 2018092782 A | 6/2018 |

OTHER PUBLICATIONS

Notification of Transmittal of the International Search Report and Written Opinion of the International Search Authority for International Patent Application No. PCT/US2020/013458, dated Aug. 26, 2020, 11 pages.

Korea Intellectual Property Office, Notification of Preliminary Rejection for Korean Patent Application No. 10-2021-7027046, dated Dec. 26, 2022, 58 pages.

Japan Patent Office official action for Japanese Patent Application No. 2021-544117, dated Jan. 17, 2023, 3 pages.

Taiwan Intellectual Property Office (TIPO) Office Communication, Allowance Decision for ROC (Taiwan) Patent Application No. 109101194, dated Jan. 13, 2023, 6 pages.

Indian Intellectual Property Office Communication, Examination Report for Indian Patent Application. No. 202147032138, dated Feb. 17, 2023, 6 pages.

* cited by examiner

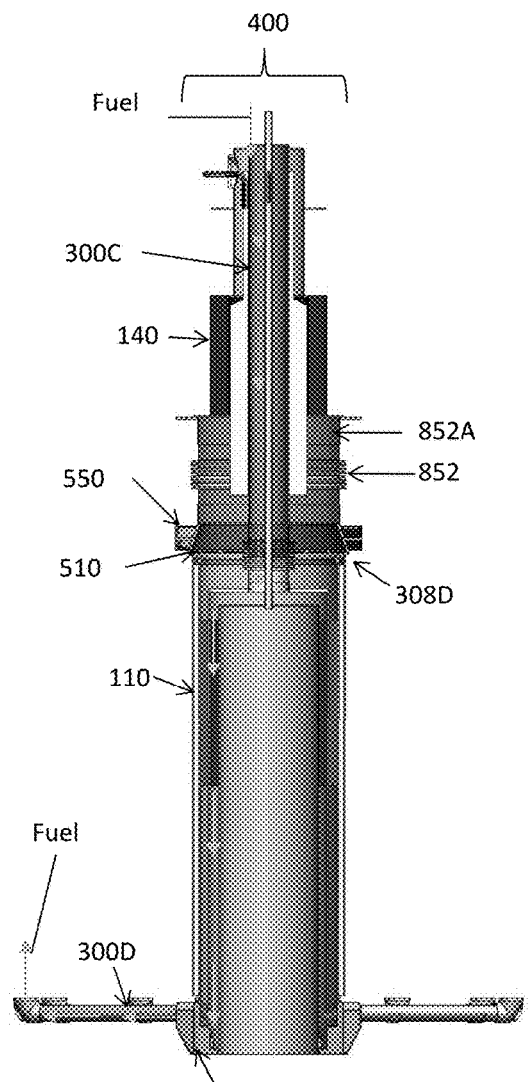
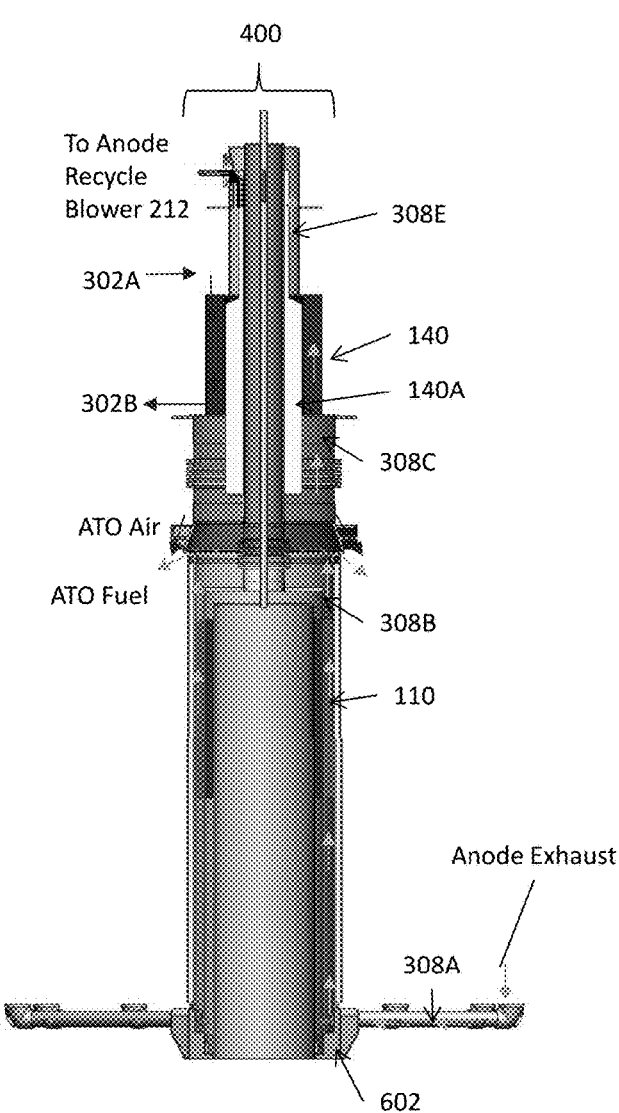
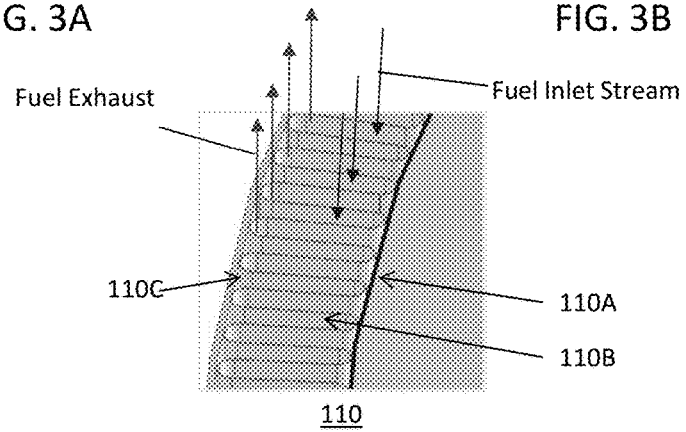
FIG. 3A
FIG. 3B
FIG. 3C

FUEL CELL SYSTEM CONTAINING WATER INJECTOR AND METHOD OF OPERATING THE SAME

FIELD

Aspects of the present invention relate to fuel cell systems and methods, and more particularly, to fuel cell systems including a water injector configured to inject water into an anode exhaust recycle stream.

BACKGROUND

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

According to various embodiments, a fuel cell system comprises a fuel cell stack, an anode exhaust conduit configured to receive an anode exhaust from the stack, and a water injector configured to inject water into the anode exhaust in the anode exhaust conduit.

According to various embodiments, a method of operating a fuel cell system comprises providing at least a portion of an anode exhaust from a fuel cell stack to a water injector, supplying water to the water injector, and injecting the water from the water injector into the at least the portion of the anode exhaust to vaporize the water and generate a humidified anode exhaust.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIGS. 3A-3C are sectional views showing fuel and air flow through the central column of the system of FIG. 2A, according to various embodiments of the present disclosure.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In a solid oxide fuel cell (SOFC) system, a fuel inlet stream may be humidified in order to facilitate fuel reformation reactions such as steam reformation and water-gas shift reactions. In addition, during system startup, shutdown, and power grid interruption events, water may be added to a fuel inlet stream in order to prevent coking of system components such as catalysts. Conventionally, such humidification is performed by vaporizing water in a steam generator containing corrugated tubing. Water flows through the corrugated tubing and is heated by the cathode recuperator heat exchanger exhaust stream which flows around the outside of the tubing. However, utilizing relatively low-temperature cathode recuperator exhaust stream generally requires substantial lengths of corrugated tubing, in order to absorb enough heat to vaporize the water. Further, the steam generator is relative large and bulky, which also adds to the system size, complexity and manufacturing costs.

In contrast, embodiments of the present disclosure provide a water injector configured to inject water directly into the anode exhaust recycle stream which provides heat to vaporize the water into steam and/or aerosolize the water into droplets small enough to be entrained in the anode exhaust stream. The anode exhaust recycle stream is recycled into the fuel inlet stream provided into the fuel cell stack, such that humidified fuel is provided to the fuel cells of the fuel cell stack. Thus, the prior art steam generator may be omitted to reduce system size, complexity and cost. In addition, the embodiment system may operate using relatively short, non-corrugated water conduit, which may improve system response times and reduce system size and cost.

Figure 1:
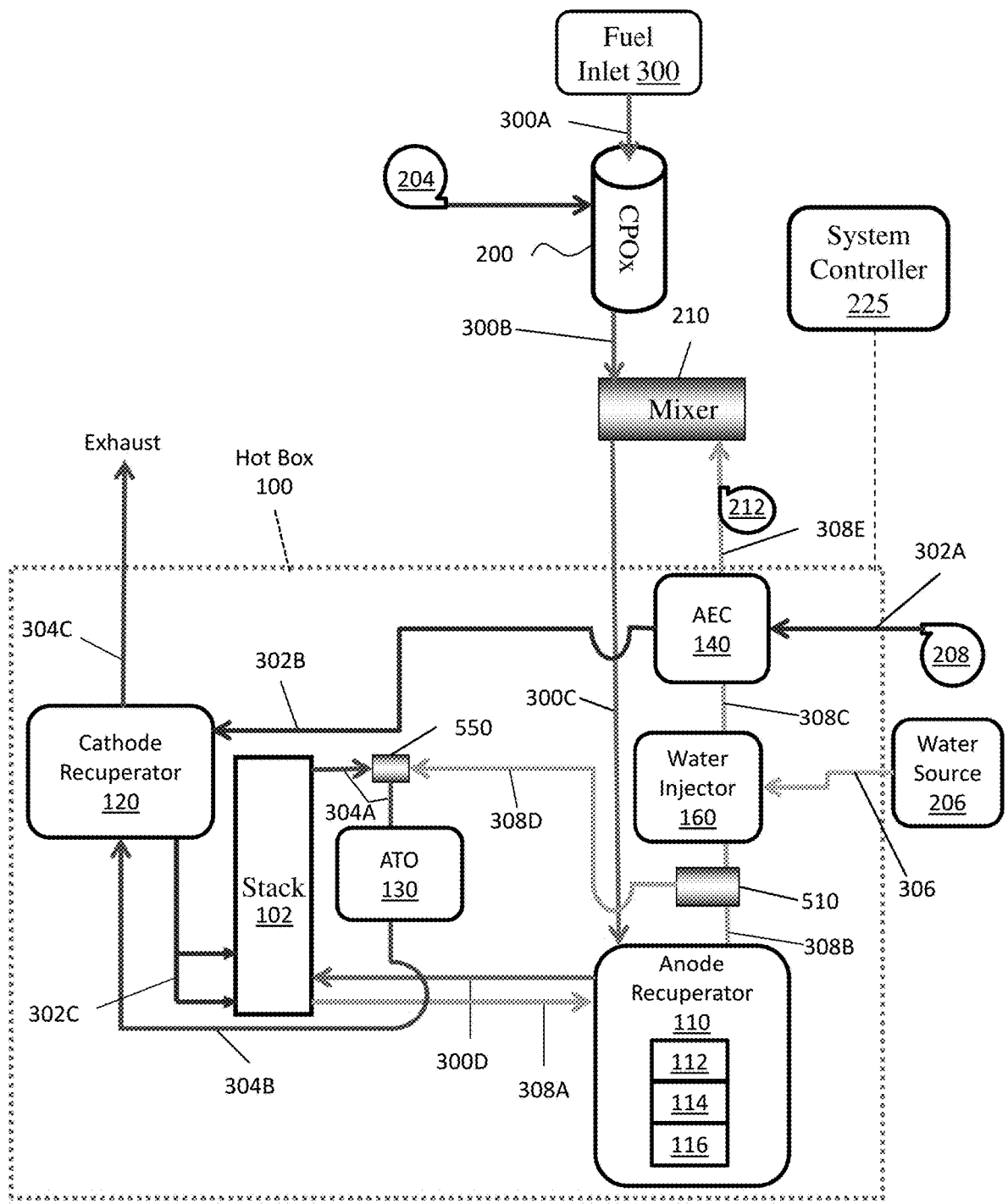
FIG. 1 is a schematic of a fuel cell system, according to various embodiments of the present disclosure.

FIG. 1 is a schematic representation of a SOFC system 10, according to various embodiments of the present disclosure. Referring to FIG. 1, the system 10 includes a hotbox 100 and various components disposed therein or adjacent thereto. The hot box 100 may contain fuel cell stacks 102, such as a solid oxide fuel cell stacks containing alternating fuel cells and interconnects. One solid oxide fuel cell of the stack contains a ceramic electrolyte, such as yttria stabilized zirconia (YSZ), scandia stabilized zirconia (SSZ), scandia and ceria stabilized zirconia or scandia, yttria and ceria stabilized zirconia, an anode electrode, such as a nickel-YSZ, a nickel-SSZ or nickel-doped ceria cermet, and a cathode electrode, such as lanthanum strontium manganite (LSM). The interconnects may be metal alloy interconnects, such as chromium-iron alloy interconnects. The stacks 102 may be arranged over each other in a plurality of columns.

The hot box 100 may also contain an anode recuperator heat exchanger 110, a cathode recuperator heat exchanger 120, an anode tail gas oxidizer (ATO) 130, an anode exhaust cooler heat exchanger 140, a splitter 510, a vortex generator 550, and a water injector 160. The system 10 may also include a catalytic partial oxidation (CPOx) reactor 200, a mixer 210, a CPOx blower 204 (e.g., air blower), a system blower 208 (e.g., air blower), and an anode recycle blower 212, which may be disposed outside of the hotbox 100. However, the present disclosure is not limited to any particular location for each of the components with respect to the hotbox 100.

The CPOx reactor 200 receives a fuel inlet stream from a fuel inlet 300, through fuel conduit 300A. The fuel inlet 300 may be a fuel tank or a utility natural gas line including a valve to control an amount of fuel provided to the CPOx reactor 200. The CPOx blower 204 may provide air to the CPOx reactor 202 during system start-up. The fuel and/or air may be provided to the mixer 210 by fuel conduit 300B. Fuel (e.g., the fuel inlet stream 1721 described below with respect to FIGS. 4A-4C) flows from the mixer 210 to the anode recuperator 110 through fuel conduit 300C. The fuel is heated in the anode recuperator 110 by a portion of the fuel exhaust and the fuel then flows from the anode recuperator 110 to the stack 102 through fuel conduit 300D.

The main air blower 208 may be configured to provide an air stream (e.g., air inlet stream) to the anode exhaust cooler 140 through air conduit 302A. Air flows from the anode exhaust cooler 140 to the cathode recuperator 120 through air conduit 302B. The air is heated by the ATO exhaust in the cathode recuperator 120. The air flows from the cathode recuperator 120 to the stack 102 through air conduit 302C.

An anode exhaust stream (e.g., the fuel exhaust stream described below with respect to FIGS. 3A-3C) generated in the stack 102 is provided to the anode recuperator 110 through anode exhaust conduit 308A. The anode exhaust may contain unreacted fuel and may also be referred to herein as fuel exhaust. The anode exhaust may be provided from the anode recuperator 110 to the splitter 510 by anode exhaust conduit 308B. A first portion of the anode exhaust may be provided from the splitter 510 to the anode exhaust cooler 140 through the water injector 160 and the anode exhaust conduit 308C. A second portion of the anode exhaust is provided from the splitter 510 to the ATO 130 through the anode exhaust conduit 308D. The first portion of the anode exhaust heats the air inlet stream in the anode exhaust cooler 140 and may then be provided from the anode exhaust cooler 140 to the mixer 210 through the anode exhaust conduit 308E. The anode recycle blower 212 may be configured to move anode exhaust though anode exhaust conduit 308E, as discussed below.

Cathode exhaust generated in the stack 102 flows to the ATO 130 through exhaust conduit 304A. The vortex generator 550 may be disposed in exhaust conduit 304A and may be configured to swirl the cathode exhaust. The anode exhaust conduit 308D may be fluidly connected to the vortex generator 550 or to the cathode exhaust conduit 304A or the ATO 130 downstream of the vortex generator 550. The swirled cathode exhaust may mix with the second portion of the anode exhaust provided by the splitter 510 before being provided to the ATO 130. The mixture may be oxidized in the ATO 130 to generate an ATO exhaust. The ATO exhaust flows from the ATO 130 to the cathode recuperator 120 through exhaust conduit 304B. Exhaust flows from the cathode recuperator and out of the hotbox 100 through exhaust conduit 304C.

Water flows from a water source 206, such as a water tank or a water pipe, to the water injector 160 through water conduit 306. The water injector 160 injects water directly into first portion of the anode exhaust provided in conduit 308C. Heat from the first portion of the anode exhaust (also referred to as a recycled anode exhaust stream) provided in exhaust conduit 308C vaporizes the water to generate steam. The steam mixes with the anode exhaust, and the resultant mixture is provided to the anode exhaust cooler 140. The mixture is then provided from the anode exhaust cooler 140 to the mixer 210 through the anode exhaust conduit 308E. The mixer 210 is configured to mix the steam and first portion of the anode exhaust with fresh fuel (i.e., fuel inlet stream). This humidified fuel mixture may then be heated in the anode recuperator 110 by the anode exhaust, before being provided to the stack 102. The system 10 may also include one or more fuel reforming catalysts 112, 114, and 116 located inside and/or downstream of the anode recuperator 100. The reforming catalyst(s) reform the humidified fuel mixture before it is provided to the stack 102.

The system 10 may further a system controller 225 configured to control various elements of the system 10. The controller 225 may include a central processing unit configured to execute stored instructions. For example, the controller 225 may be configured to control fuel and/or air flow through the system 10, according to fuel composition data.

Figures 2A, 2B:
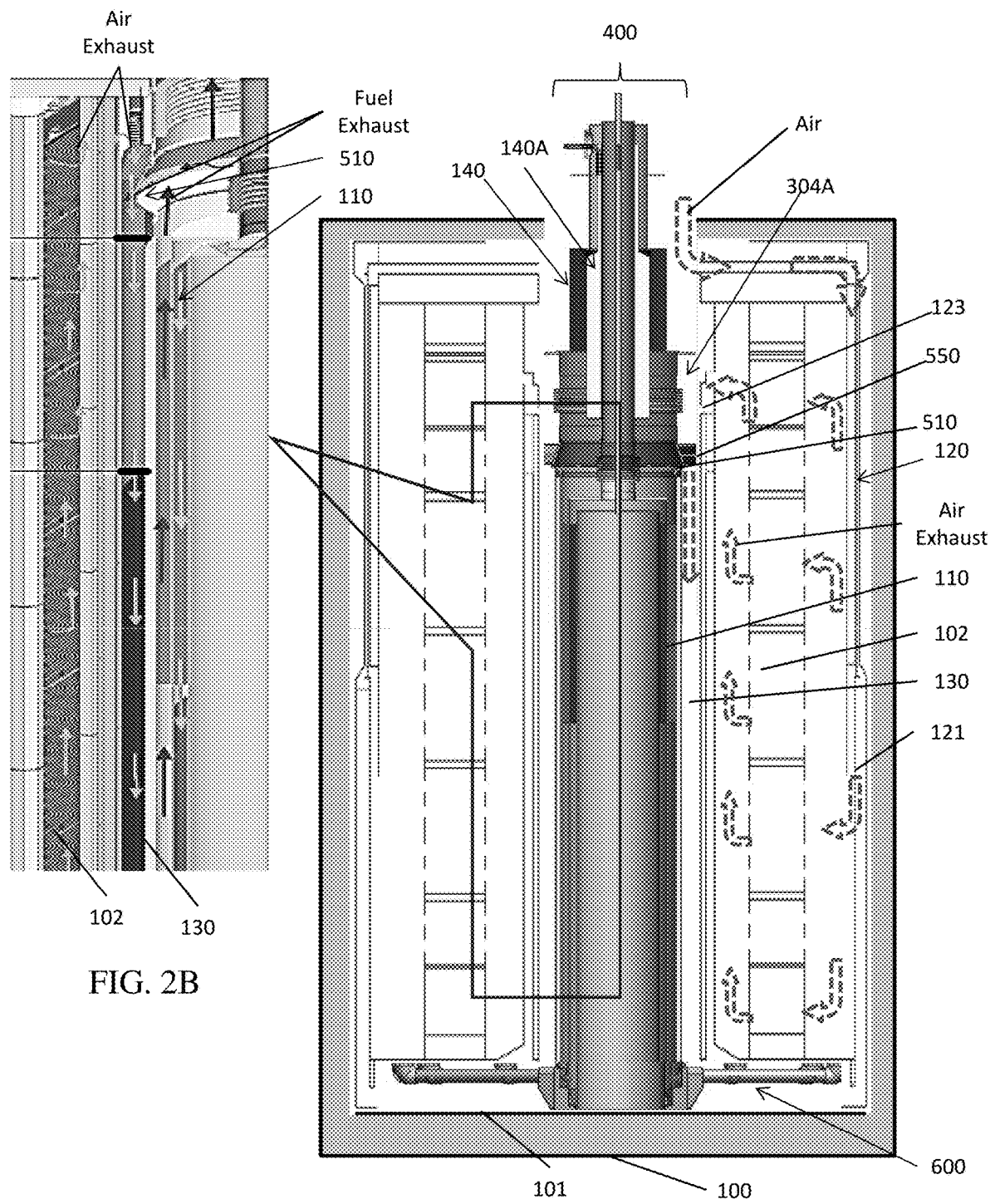
FIG. 2A is a sectional view showing components of the hot box of the system of FIG. 1.
FIG. 2B shows an enlarged portion of the system of FIG. 2A.
Figure 2C:
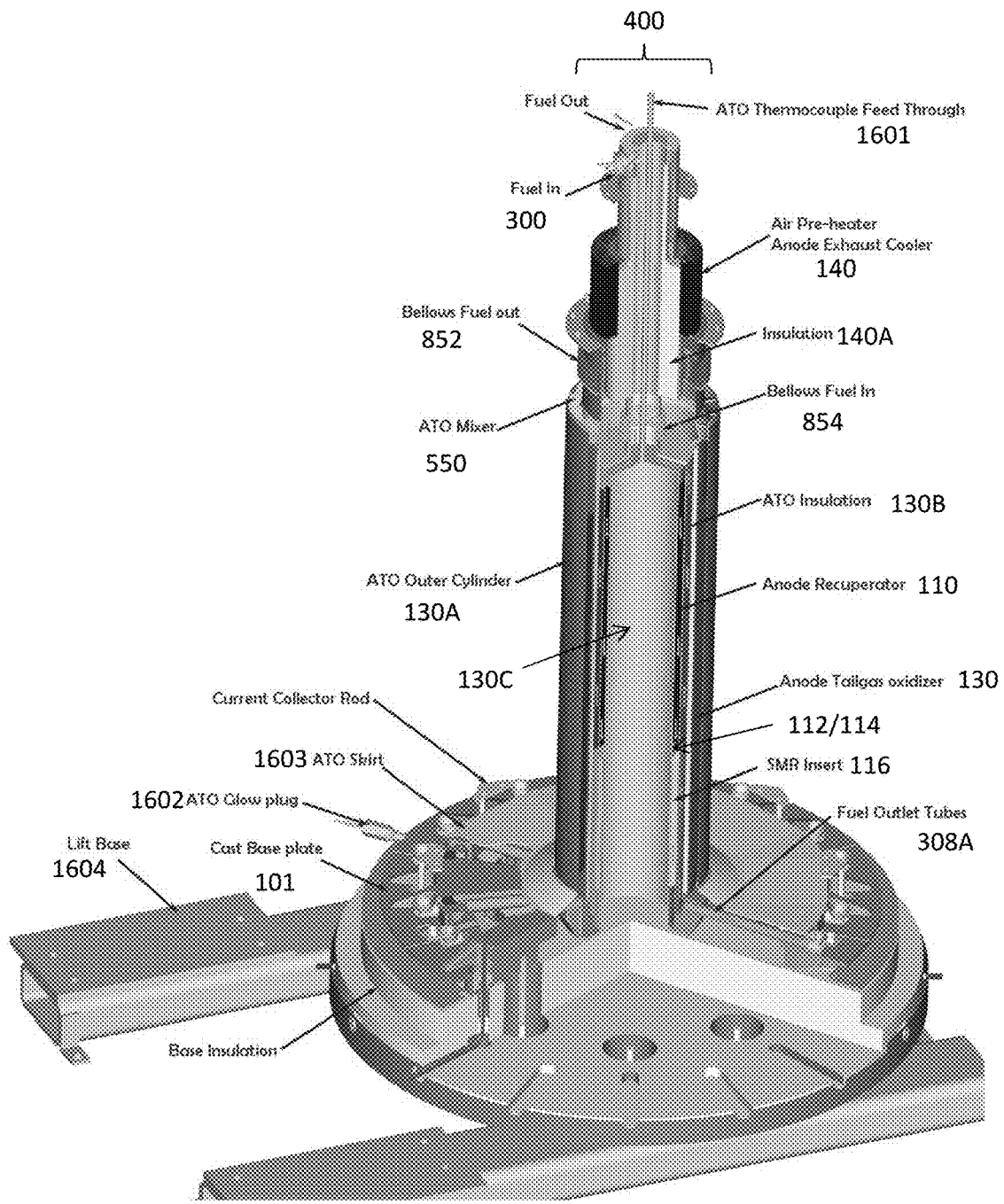
FIG. 2C is a three dimensional cut-away view of a central column of the system of FIG. 2A.
Figure 2D:
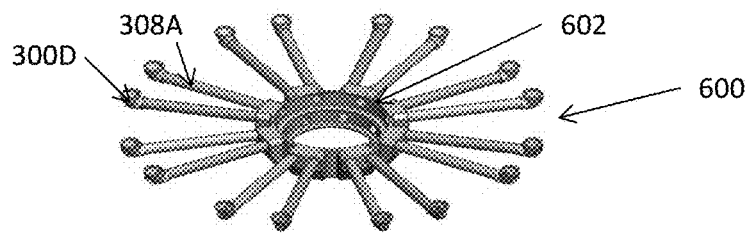
FIG. 2D is a perspective view of an anode hub structure disposed below the central column of the system of FIG. 2A, according to various embodiments of the present disclosure.

FIG. 2A is a sectional view showing components of the hot box 100 of the system 10 of FIG. 1, and FIG. 2B shows an enlarged portion of FIG. 2A. FIG. 2C is a three dimensional cut-away view of a central column 400 of the system 10, according to various embodiments of the present disclosure, and FIG. 2D is a perspective view of an anode hub structure 600 disposed in a hot box base 101 on which the column 400 may be disposed.

Referring to FIGS. 2A-2D, the fuel cell stacks 102 may be disposed around the central column 400 in the hot box 100. For example, the stacks 102 may be disposed in a ring configuration around the central column 400 and may be positioned on the hot box base 101. The column 400 may include the anode recuperator 110, the ATO 130, and the anode exhaust cooler 140. In particular, the anode recuperator 110 is disposed radially inward of the ATO 130, and the anode exhaust cooler 140 is mounted over the anode recuperator 110 and the ATO 130. In one embodiment, an oxidation catalyst 112 and/or the hydrogenation catalyst 114 may be located in the anode recuperator 110. A reforming catalyst 116 may also be located at the bottom of the anode recuperator 110 as a steam methane reformation (SMR) insert.

The ATO 130 comprises an outer cylinder 130A that is positioned around inner ATO insulation 130B/outer wall of the anode recuperator 110. Optionally, the insulation 130B may be enclosed by an inner ATO cylinder 130C. Thus, the insulation 130B may be located between the anode recuperator 110 and the ATO 130. An ATO oxidation catalyst may be located in the space between the outer cylinder 130A and the ATO insulation 130B. A fuel inlet path bellows 854 may be located between the anode exhaust cooler 140 and the inner ATO cylinder 130C. An ATO thermocouple feed through 1601 extends through the anode exhaust cooler 140, to the top of the ATO 130. The temperature of the ATO 130 may thereby be monitored by inserting one or more thermocouples (not shown) through this feed through 1601.

The anode hub structure 600 may be positioned under the anode recuperator 110 and ATO 130 and over the hot box base 101. The anode hub structure 600 is covered by an ATO skirt 1603. The vortex generator 550 and fuel exhaust splitter 510 are located over the anode recuperator 110 and ATO 130 and below the anode exhaust cooler 140. An ATO glow plug 1602, which initiates the oxidation of the stack fuel exhaust in the ATO during startup, may be located near the bottom of the ATO 130.

The anode hub structure 600 is used to distribute fuel evenly from the central column to fuel cell stacks 102 disposed around the central column 400. The anode flow hub structure 600 includes a grooved cast base 602 and a "spider" hub of fuel inlet conduits 300D and outlet conduits 308A. Each pair of conduits 300D, 308A connects to a fuel cell stack 102. Anode side cylinders (e.g., anode recuperator 110 inner and outer cylinders and ATO outer cylinder 130A) are then welded or brazed into the grooves in the base 602, creating a uniform volume cross section for flow distribution as discussed below.

A lift base 1604 is located under the hot box base 101, as illustrated in FIG. 2C. In an embodiment, the lift base 1604 includes two hollow arms with which the forks of a fork lift can be inserted to lift and move the system, such as to remove the system from a cabinet (not shown) for repair or servicing.

As shown by the arrows in FIGS. 2A and 2B, air enters the top of the hot box 100 and then flows into the cathode recuperator 120 where it is heated by ATO exhaust (not shown) from the ATO 130. The heated air then flows inside the cathode recuperator 120 through a first vent or opening 121. The air then flows through the stacks 102 and reacts with fuel (i.e., fuel inlet stream) provided from the anode hub structure 600. Air exhaust flows from the stacks 102, through a second vent or opening 123. The air exhaust then passes through vanes of the vortex generator 550 and is swirled before entering the ATO 130.

The splitter 510 may direct the second portion of the fuel exhaust exiting the top of the anode recuperator 100 through openings (e.g., slits) in the splitter into the swirled air exhaust (e.g., in the vortex generator 550 or downstream of the vortex generator in conduit 304A or in the ATO 130). At such the fuel and air exhaust may be mixed before entering the ATO 130.

FIGS. 3A and 3B are side cross-sectional views showing flow distribution through the central column 400, and 3C is top cross-sectional view taken through the anode recuperator 110. Referring to FIGS. 2A, 2B, 3A, and 3C, the anode recuperator 110 includes an inner cylinder 110A, a corrugated plate 110B, and an outer cylinder 110C that may be coated with the ATO insulation 130B. Fuel from fuel conduit 300C enters the top of the central column 400. The fuel then bypasses the anode exhaust cooler 140 by flowing through its hollow core and then flows through the anode recuperator 110, between the outer cylinder 110C and the and the corrugated plate 110B. The fuel then flows through the hub base 602 and conduits 300D of the anode hub structure 600 shown in FIG. 3B, to the stacks 102.

Referring to FIGS. 2A, 2B, 2C, 3A, and 3B, the fuel exhaust flows from the stacks 102 through conduits 308A into the hub base 602, and from the hub base 602 through the anode recuperator 110, between in inner cylinder 110A and the corrugated plate 110B, and through conduit 308B into the splitter 510. The first portion of the fuel exhaust flows from the splitter 510 to the anode exhaust cooler 140 through conduit 308C, while the second portion flows from the splitter 510 to the ATO 130 through conduit 308D, as shown in FIG. 1. Anode exhaust cooler inner core insulation 140A may be located between the fuel conduit 300C and bellows 852/supporting cylinder 852A located between the anode exhaust cooler 140 and the vortex generator 550, as shown in FIG. 3A. This insulation minimizes heat transfer and loss from the first portion of the anode exhaust stream in conduit 308C on the way to the anode exhaust cooler 140. Insulation 140A may also be located between conduit 300C and the anode exhaust cooler 140 to avoid heat transfer between the fuel inlet stream in conduit 300C and the streams in the anode exhaust cooler 140. In other embodiments, insulation 140A may be omitted from inside the cylindrical anode exhaust cooler 140.

FIG. 3B also shows air flowing from the air conduit 302A to the anode exhaust cooler 140 (where it is heated by the first portion of the anode exhaust) and then from the anode exhaust cooler 140 through conduit 302B to the cathode recuperator 120. The first portion of the anode exhaust is cooled in the anode exhaust cooler 140 by the air flowing through the anode exhaust cooler 140. The cooled first portion of the anode exhaust is then provided from the anode exhaust cooler 140 to the anode recycle blower 212 shown in FIG. 1.

As will be described in more detail below and as shown in FIGS. 2A and 3B, the anode exhaust exits the anode recuperator 110 and is provided into splitter 510 through conduit 308B. The splitter 510 splits the anode exhaust into first and second anode exhaust portions (i.e., streams). The first stream is provided into the anode exhaust cooler 140 through conduit 308C. The second stream is provided to the ATO 130 through conduit 308D.

The relative amounts of anode exhaust provided to the ATO 130 and the anode exhaust cooler 140 is controlled by the anode recycle blower 212. The higher the blower 212 speed, the larger portion of the anode exhaust is provided into conduit 308C and a smaller portion of the anode exhaust is provided to the ATO 130 via conduit 308D, and vice-versa.

The anode exhaust provided to the ATO 130 is not cooled in the anode exhaust cooler 140. This allows higher temperature anode exhaust to be provided into the ATO 130 than if the anode exhaust were provided after flowing through the anode exhaust cooler 140. For example, the anode exhaust provided into the ATO 130 from the splitter 510 may have a temperature of above 350° C., such as from about 350 to about 500° C., for example, from about 375 to about 425° C., or from about 390 to about 410° C. Furthermore, since a smaller amount of anode exhaust is provided into the anode exhaust cooler 140 (e.g., not 100% of the anode exhaust is provided into the anode exhaust cooler due to the splitting of the anode exhaust in splitter 510), the heat exchange area of the anode exhaust cooler 140 may be reduced. The anode exhaust provided to the ATO 130 may be oxidized by the stack cathode (i.e., air) exhaust and provided to the cathode recuperator 120 through conduit 304B.

Figure 4A:
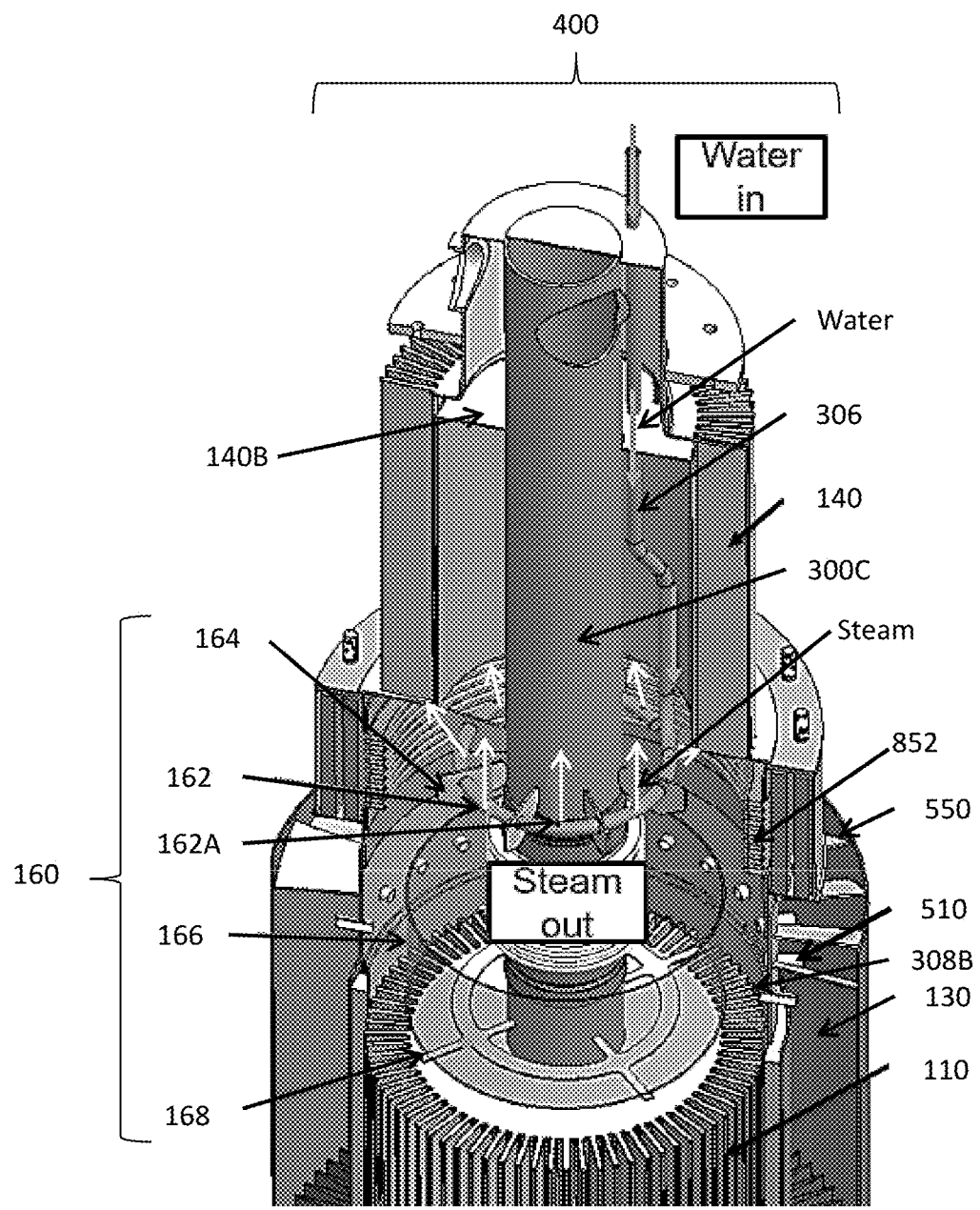
FIG. 4A is a partial perspective view of a water injector disposed in the central column of the system of FIG. 2A.
Figure 4B:
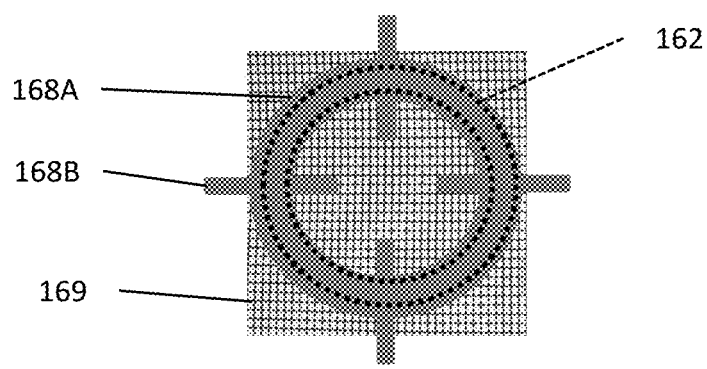
FIG. 4B is a top view of components of the water injector of FIG. 4A.
Figure 4C:
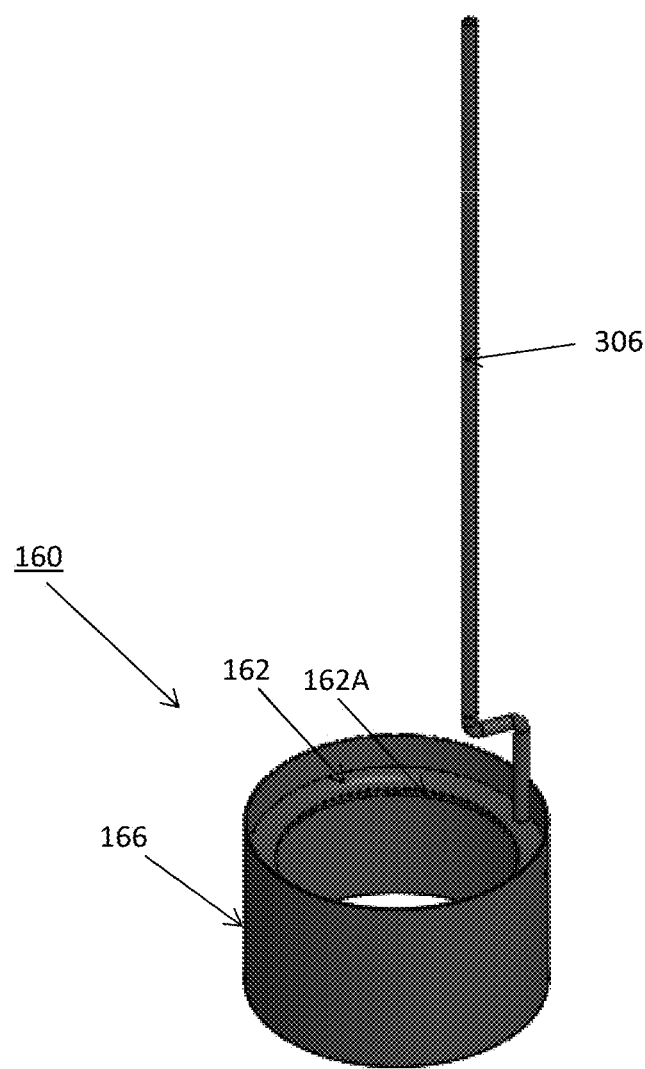
FIG. 4C is a perspective view of the water injector, according to various embodiments of the present disclosure.

FIG. 4A is a sectional perspective view showing the water injector 160 in the central column of FIG. 2A, FIG. 4B is a top view showing an injector ring 162 and a baffle 168 of FIG. 4A, and FIG. 4C is a perspective view of the water injector 160, according to various embodiments of the present disclosure according to various embodiments of the present disclosure. In the embodiment of FIG. 4A, the splitter 510 may comprise tubes that extend through the outer wall of the anode exhaust conduit 308B rather than horizontal slits shown in FIG. 3A. It should be understood that either the tube or slit type of splitter 510 may be used with the water injector 160 of the present embodiment. Referring to FIGS. 1, 4A, 4B and 4C, the water injector 160 may include the injector ring 162, restraint tabs 164, a shroud 166, and the baffle 168.

The injector ring 162 may be disposed inside the anode exhaust conduit 308C between the anode exhaust cooler 140 and the anode recuperator 110 and may be fluidly connected to the water conduit 306. The injector ring 162 is a tube that extends around the fuel conduit 300C. The injector ring 162 may include injection apertures (i.e., openings) 162A configured to inject water directly into the first portion of the anode exhaust flowing in the conduit 308C from the splitter 510 and anode recuperator 110. The water may be vaporized by the hot first portion of the anode exhaust. The injection apertures 162A may be configured to generate streams or droplets of water, which may be vaporized instantaneously or within seconds of emerging from the injector ring 162. The injection apertures 162A may be located on any one or more surfaces of the injector ring 162, such as the upper surface of the injector ring 162 (as shown in FIG. 4A), the inner surface of the injector ring 162 (as shown in FIG. 4C), the lower surface of the injector ring 162 and/or the outer surface of the injector ring 162. For example, as shown in the embodiment of FIG. 4A, the injection apertures 162A may be evenly distributed on an upper surface of the injector ring 162 to provide uniform water upward into the anode exhaust to decrease the amount of water dripping down toward the splitter 510. The injector ring 162 may also be sized to provide substantially uniform circumferential flow of water therein and to minimize a pressure drop in the anode exhaust flowing thereby.

The restraint tabs 164 may be attached to the fuel conduit 300C and/or the shroud 166 and may be configured to support the injector ring 162. In particular, the restraint tabs 164 may be configured to align and control the orientation of the injector ring 162 and prevent uneven water distribution or buildup thereon. For example, the restraint tabs 164 may be configured to horizontally align the injector ring 162. The restraint tabs 164 may also prevent water from accumulating on the injector ring 162 in any particular location. As such, the restraint tabs 164 may be configured to prevent water from accumulating on the outer surface of the injector ring 162 and dripping in only one location, which may be especially important if the injector ring 162 is not perfectly level.

The shroud 166 may be a cylinder which surrounds the injector ring 162. The shroud 166 may be configured to segregate the water from the second portion of the anode exhaust flowing into the ATO 130 through the splitter 510. In particular, the second portion of the anode exhaust flowing outside of the shroud 166 may be directed by the splitter 510 radially outward toward the anode exhaust conduit 308D and the ATO 130, while the first portion of the anode exhaust flowing inside of the shroud 166 is directed upward by the splitter 510 toward the injector ring 162 in the anode exhaust conduit 308C. Accordingly, the shroud 166 may be configured to prevent or reduce the amount of water and/or the first portion of the anode exhaust that has been humidified by the injected water from being injected into the ATO 130 by the splitter 510. In other words, the shroud 166 is configured such that substantially all of the water and the humidified first portion of the anode exhaust are directed towards the anode exhaust cooler 140.

The baffle 168 may be disposed inside the anode exhaust conduit 308C below the injector ring 162 and around the fuel conduit 300C. The baffle 168 may include a baffle ring 168A and baffle tabs 168B that extend therefrom. The baffle tabs 168B may contact the fuel conduit 300C and the shroud 166 and may operate to keep both the shroud 166 and the baffle ring 168A aligned around the fuel conduit 300C within the central column 400. In particular, the baffle ring 168A may be aligned to vertically overlap with (e.g., be concentric with) the injector ring 162, as shown in FIG. 4B.

Therefore, the baffle 168 may operate as a surface to catch and vaporize water droplets that do not instantaneously transform into steam and drip from the injector ring 162. Accordingly, the baffle 168 also protects brazed joints of the anode recuperator 110 that located below the injector ring 162 from contact with water droplets and the corresponding thermal shock.

In various embodiments, the water injector 160 may optionally include a mesh 169 or porous material disposed below the baffle 168. The mesh 169 may be configured to capture any droplets that drip from the injector ring 162 and bypass the baffle 168, such that the captured droplets are vaporized before reaching the anode recuperator 110 and/or the splitter 510.

Figure 5:
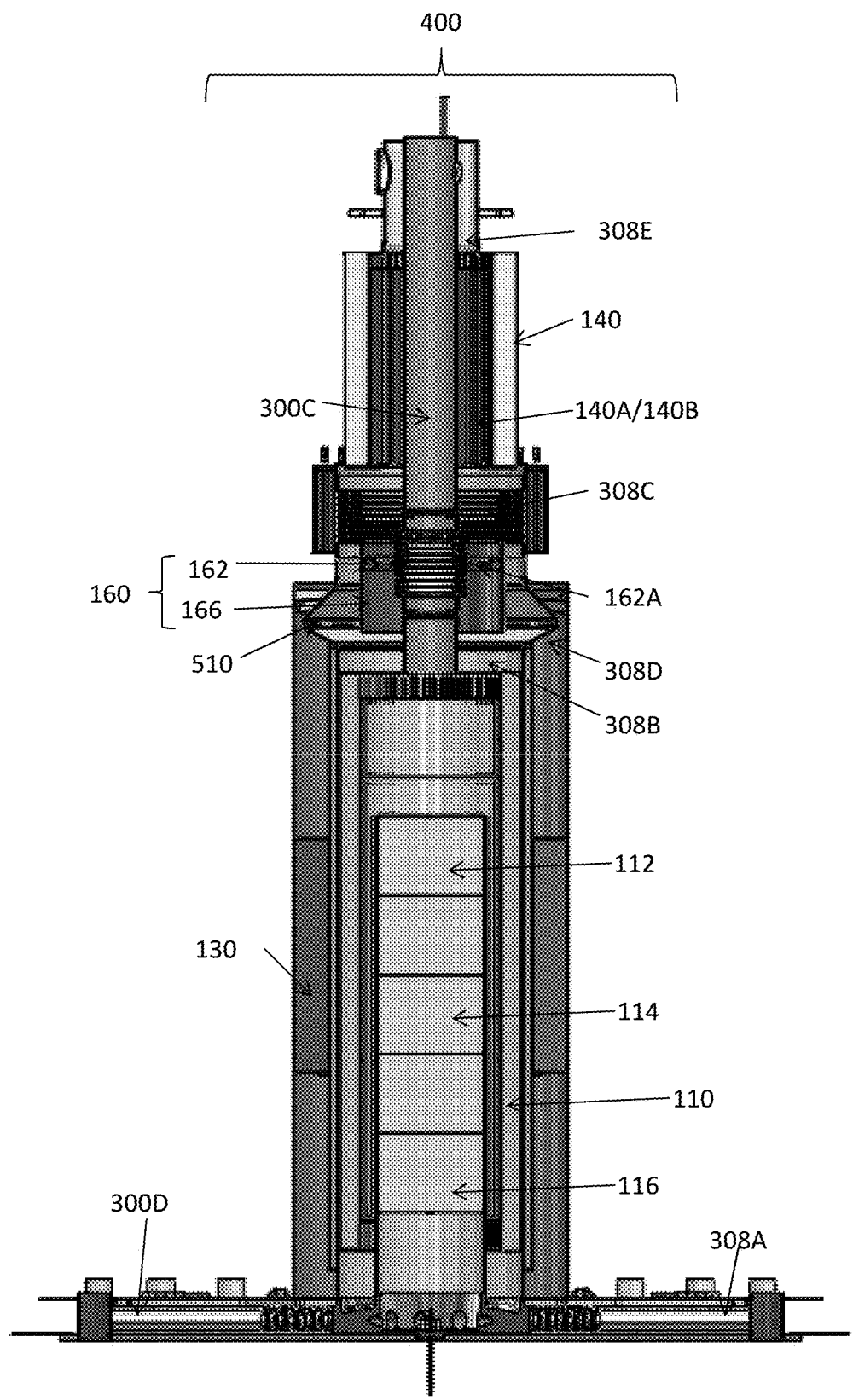
FIG. 5 is a side cross-sectional view showing an alternative embodiment of the components of the hot box of the system of FIG. 1.

FIG. 5 illustrates an alternative configuration of hot box 100 components of the fuel cell system 10. As illustrated in FIG. 5, the central column 400 includes the slit type splitter 510 described above with respect to FIG. 3A instead of the tube type splitter 510 described above with respect to FIG. 4A. Furthermore, the water injector 160 of FIG. 5A includes injection apertures 162A on the inner surface of the injector ring 162. Finally, the catalysts 112, 114 and 116 of FIG. 5 are located inside the inner plenum which is surrounded by the anode recuperator 110, similar to the configuration described in U.S. Pat. No. 9,287,572 B2, issued Mar. 15, 2016 and incorporated herein by reference in its entirety. Other components shown in FIG. 5 are the same as or similar to those shown in FIG. 4A and will not be described further to avoid redundancy. Any one or more components from the central column shown in FIG. 5 may be used in the central column shown in FIG. 4A.

Furthermore, while the water injectors 160 shown in FIGS. 4A to 4C and 5 include an injector ring 162 with injection apertures 162A, other water injector configurations may be used instead. For example, the water may be injected into the first portion of the anode exhaust directly from the water conduit 306 without using the injector ring 162. Alternatively, water may be injected from plural tubes arranged in any suitable configuration in the exhaust conduit 308C. The tubes may be fluidly connected to the water conduit 306. Furthermore, one or more of the shroud 166, the baffle 168 and/or mesh 169 may be omitted.

During operation of the fuel cell system 10, such as during system startup, water is generally not required until the stack 102 reaches a temperature of about 300° C. or more, such as a temperature ranging from about 300° C. to about 325° C. Once the stack 102 approaches about 300° C., water is provided from the water source 206 to water conduit 306 at the top of the central column 400. The water conduit 306 passes through the insulation 140A that that is located between and separates the fuel conduit 300C from the anode exhaust cooler 140. The insulation reduces the amount of heat exchange between the water in the water conduit 306 and the anode exhaust cooler 140. Accordingly, while passing through water conduit 306, the water may be slightly heated above ambient temperature by anode exhaust in the surrounding toroidal anode cooler 140. However, while not wishing to be bound by a particular theory, it is believed that at least the majority of the water remains in a liquid state while in the water conduit 306.

The water is then provided by the water conduit 306 to the water injector 160. For example, the water is provided by the water conduit into the injector ring 162. The water flows circumferentially in the injector ring 162 and is circumferentially dispersed before being ejected into the first portion of the anode exhaust through the injection apertures 162A. In one embodiment, at least a portion of the water is injected in the liquid state into the first portion of the anode exhaust stream. The water is then vaporized in the first portion of the anode exhaust to form a humidified anode exhaust. The humidified anode exhaust is then provided through conduit 308E to the mixer 210 for mixing with fresh fuel (i.e., fuel inlet stream) before being provided to the anode recuperator 110 and the stack 102 as discussed above.

Referring to all drawings described above, the fuel cell system 10 includes the fuel cell stack 102, the anode exhaust conduit 308C configured to receive an anode exhaust from the stack 102, and the water injector 160 configured to inject water into the anode exhaust in the anode exhaust conduit 308C.

In one embodiment, the system 10 also includes the anode recuperator 110 located below the water injector 160 and configured to receive the anode exhaust from the stack 102, to heat fuel provided to the stack 102 using heat from the anode exhaust and to provide the anode exhaust to the anode exhaust conduit 308C and the water injector 160. The system 10 also includes the anode exhaust cooler 140 disposed above the water injector 160 and the anode recuperator 110 and configured to heat air provided to the stack 102 using the anode exhaust provided from the water injector and the anode recuperator.

In one embodiment, the system 10 also includes a water conduit 306 extending through the anode cooler insulation 140A surrounded by the anode exhaust cooler 140 and configured to provide the water to the water injector 160. In one embodiment, the system 10 does not include a steam generator, and the water injector 160 includes the injector ring 162 disposed between the anode exhaust cooler 140 and the anode recuperator 110. The injector ring 162 is fluidly connected to the water conduit 306, and the injector ring 162 is configured to inject the water into the anode exhaust which flows in the anode exhaust conduit 308C from the anode recuperator 110 to the anode exhaust cooler 140. The injector ring 162 comprises injection apertures 162A in a surface thereof and configured to inject the water into the anode exhaust.

In one embodiment, the system 10 also includes a fuel conduit 300C surrounded by the anode cooler insulation 140A and the anode exhaust conduit 308C. The fuel conduit extends 300C through the middle of the injector ring 162 and is configured to provide the fuel to the stack 102 through the anode recuperator 110.

In one embodiment, the water injector 160 further comprises a shroud 166 surrounding the injector ring 162. In one embodiment, the water injector 160 further comprises restraint tabs 164 connected to the fuel conduit 300C and to the shroud 166. The restraint tabs 164 are configured to support the injector ring 162 such that the injector ring is disposed in a substantially horizontal plane. In one embodiment, water injector 160 further comprises a mesh or a porous material 169 disposed below the injector ring 162 and configured to reduce or prevent water from dripping onto the anode recuperator 110.

In one embodiment, the water injector 160 further comprises a baffle 168 disposed below the injector ring 162. The baffle 168 comprises a baffle ring 168A disposed around the fuel conduit 300C and vertically overlapped with the injector ring 162, and baffle tabs 168B extending from the baffle ring 168A and configured to align the baffle ring 168A such that the baffle ring is vertically overlapped with injector ring 162.

In one embodiment, the system 10 also includes an anode tail gas oxidizer 130, and a splitter 510 configured to direct a first portion of the anode exhaust provided from the anode recuperator 110 into the anode exhaust conduit 308C and the water injector 160, and to direct a second portion of the anode exhaust provided from the anode recuperator 110 into the anode tail gas oxidizer 130. An anode recycle blower is configured to recycle the first portion of the anode exhaust into the fuel conduit 300C. The shroud 166 is configured to direct the water away from the splitter 510.

A method of operating a fuel cell system comprises providing at least a portion of an anode exhaust from the fuel cell stack 102 to the water injector 160, supplying water to the water injector 160, and injecting the water from the water injector 160 into the at least the portion of the anode exhaust to vaporize the water and generate a humidified anode exhaust.

In one embodiment, supplying water to the water injector comprises supplying the water in a liquid state to the water injector 160 after the stack 102 reaches a temperature of about 300° C. or more. In one embodiment, the method also includes providing the anode exhaust from the stack 102 to an anode recuperator 110 to heat a fuel inlet stream flowing to the stack 102, splitting the anode exhaust provided from the anode recuperator into a first portion of the anode exhaust and a second portion of the anode exhaust and providing the first portion of the anode exhaust into the water injector 160. The water is vaporized completely or vaporized partially and entrained in the first portion of the anode exhaust stream to form the humidified anode exhaust, while the second portion of the anode exhaust is provided into an anode tail gas oxidizer 130. The method further includes providing the humidified anode exhaust into an anode cooler 140 to heat air flowing to the stack 102, and providing the humidified anode exhaust from the anode cooler 140 into the fuel inlet stream flowing to the stack 102 through the fuel conduit 300C.

As described above, in one embodiment the water injector 160 comprises an injector ring 162 disposed between the anode exhaust cooler 140 and the anode recuperator 110. The water flows through water conduit 306 into the injector ring 162, and the water is injected from the injector ring 162 through apertures 162A in the injector ring into the first portion of the anode exhaust stream. The fuel inlet stream flows to the stack 102 through the fuel conduit 300C surrounded by anode cooler insulation 140A and by the injector ring 162. The anode cooler 140 surrounds the anode cooler insulation 140A and the water conduit extends 306 through the anode cooler insulation 140A.

In one embodiment, the water injector 160 further comprises a shroud 166 surrounding the injector ring 162. The shroud prevents or reduces water flow into the anode tail gas oxidizer 130. Restraint tabs 164 are connected to the fuel conduit 300C and to the shroud 166, and configured to support the injector ring 162 in a substantially horizontal plane.

In one embodiment, the water injector further comprises a mesh or a porous material 169 disposed below the injector ring 162. The mesh or porous material reduces or prevents water from dripping onto the anode recuperator 110. In one embodiment, the water does not pass through a steam generator between being provided into the system 10 from the water source 206 until it is injected into anode exhaust in the conduit 308C.

Accordingly, various embodiments provide a water injector that is more economical than previous designs that relied upon a steam generator containing water coils in which the water is vaporized. As such, the embodiment water injector also provides a more compact design than previous systems, allowing for improved space efficiency within a system hot box. Further, the embodiment water injector also provides for faster response times, due to having shorter conduit lengths than previous systems. Faster response times may be especially beneficial when responding to power grid interruptions and/or sudden changes to balance of plant loads.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The invention claimed is:

1. A fuel cell system, comprising:
a fuel cell stack;
an anode exhaust conduit configured to receive an anode exhaust from the stack;
a water injector configured to inject water into the anode exhaust in the anode exhaust conduit;
an anode recuperator configured to receive the anode exhaust from the stack, to heat fuel provided to the stack using heat from the anode exhaust and to provide the anode exhaust to the anode exhaust conduit and the water injector;
an anode tail gas oxidizer; and
a splitter configured to direct a first portion of the anode exhaust provided from the anode recuperator into the anode exhaust conduit and the water injector, and to direct a second portion of the anode exhaust provided from the anode recuperator into the anode tail gas oxidizer.

2. The system of claim 1, wherein the anode recuperator is located below the water injector.

3. A fuel cell system, comprising:
a fuel cell stack;
an anode exhaust conduit configured to receive an anode exhaust from the stack;
a water injector configured to inject water into the anode exhaust in the anode exhaust conduit;
an anode recuperator configured to receive the anode exhaust from the stack, to heat fuel provided to the stack using heat from the anode exhaust and to provide the anode exhaust to the anode exhaust conduit and the water injector;
an anode tail gas oxidizer; and
a splitter configured to direct a first portion of the anode exhaust provided from the anode recuperator into the anode exhaust conduit and the water injector, and to direct a second portion of the anode exhaust provided from the anode recuperator into the anode tail gas oxidizer,
wherein:
the water injector comprises a shroud surrounding an injector ring; and
the shroud is configured to direct the water away from the splitter.

4. The system of claim 3, wherein:
the fuel cell system does not include a steam generator;
the injector ring is fluidly connected to a water conduit; and
the injector ring is configured to inject the water into the anode exhaust which flows in the anode exhaust conduit.

5. The system of claim 4, wherein the injector ring comprises injection apertures in a surface thereof and configured to inject the water into the anode exhaust.

6. The system of claim 5, further comprising a fuel conduit which extends through the middle of the injector ring and configured to provide the fuel to the stack through the anode recuperator.

7. The system of claim 6, further comprising an anode recycle blower configured to recycle the first portion of the anode exhaust into the fuel conduit.

8. The system of claim 5, wherein:
the water injector further comprises restraint tabs connected to the fuel conduit and to the shroud; and
the restraint tabs are configured to support the injector ring, such that the injector ring is disposed in a substantially horizontal plane.

9. The system of claim 8, wherein:
the restraint tabs are configured to prevent water from accumulating at a single location on the outer surface of the injector ring; and
lowermost points of the restraint tabs vertically overlap with the injector ring.

10. The system of claim 3, wherein the water injector further comprises a mesh or a porous material disposed below the injector ring and configured to reduce or prevent water from dripping onto the anode recuperator, and a baffle disposed below the injector ring, wherein the baffle comprises:
a baffle ring disposed around the fuel conduit and vertically overlapped with the injector ring; and
baffle tabs extending from the baffle ring and configured to align the baffle ring, such that the baffle ring is vertically overlapped with injector ring.

11. The system of claim 1, wherein:
the water injector comprises an injector ring fluidly connected to a water conduit; and
the injector ring is configured to inject the water into the anode exhaust which flows through a middle of the injector ring in the anode exhaust conduit.

12. The system of claim 11, wherein the injector ring comprises injection apertures in a surface thereof and configured to inject the water into the anode exhaust.

13. The system of claim 12, further comprising a fuel conduit which extends through the middle of the injector ring and configured to provide the fuel to the stack through the anode recuperator.

14. The system of claim 1, further comprising a water source comprising a water pipe connected to the water injector.

* * * * *